April 28, 1970     R. J. MARTIN     3,508,847

PUMP CONTROL SYSTEM

Filed Sept. 11, 1968     2 Sheets-Sheet 1

INVENTOR.
ROBERT J. MARTIN
BY Hubert Miller
ATTORNEY

United States Patent Office  3,508,847
Patented Apr. 28, 1970

1

3,508,847
PUMP CONTROL SYSTEM
Robert J. Martin, Hutchinson, Kans., assignor to The Cessna Aircraft Company, Wichita, Kans., a corporation of Kansas
Filed Sept. 11, 1968, Ser. No. 759,027
Int. Cl. F04b 1/02, 49/00
U.S. Cl. 417—218       10 Claims

ABSTRACT OF THE DISCLOSURE

A pressure and flow compensating control for varying the displacement of a variable delivery pump to meet the changing demands of one or more fluid motors. Upon receiving an indication of either an excess flow or excess flow or excess pressure, the control reduces the pump displacement while the control will not increase the displacement until there is an indication of both deficient flow and deficient pressure.

This invention relates to a pump displacement control system and more particularly to a pressure and flow compensating control for variable delivery hydraulic pumps.

BACKGROUND OF THE INVENTION

Various types of pressure and flow compensating controls have acquired wide use in the trade. In general, a flow compensated system is one in which the displacement of the pump is automatically decreased when the fluid output exceeds a predetermined amount or automatically increases as the flow rate falls below a pre-determined minimum. A pressure compensated system is one that automatically reduces or increases the pump displacement so that a pre-determined pressure level is maintained in the pump discharge regardless of the flow rate. When a motor is supplied by a pressure compensated system it will have a tendency to overspeed when the load on the motor is decreased. One solution to this problem is to provide a separate constant volume pump with the correct displacement for the individual motor. Another solution, where a plurality of motors are being supplied by the same pump, is to provide a substantial restriction in the intake of the motor requiring a constant flow, which of course is very inefficient. Another solution, of which the present invention is included, is a combined flow and pressure compensating system.

While there have been previous controls that compensate for both pressure and flow, such as U.S. Patent No. 3,188,971, none of them operate in the same manner and with the efficiency of the present invention.

SUMMARY OF THE INVENTION

Along with a conventional pressure compensating control, the present invention includes a flow compensator that overrides the pressure control and maintains a constant pre-determined pump output flow, while maintaining the pump output pressure at only the level required to operate the motor. Only when the pump output pressure exceeds a pre-determined maximum will the pressure compensator override the flow compensator and reduce the pump displacement. Conversely, when the pump displacement is being controlled by the pressure compensator (heavy motor load condition), the flow compensator can only override the pressure compensator when the flow rate becomes excessive. By eliminating the continuous high pressures inherent in a purely pressure compensating control, the system efficiency is greatly increased.

The principal object of the present invention is to provide a single variable delivery pump that can efficiently supply the varying needs of one or more motors.

Another object is to provide a variable delivery pump for supplying a motor requiring a precise volume of flow under varying load conditions.

Figure 1:
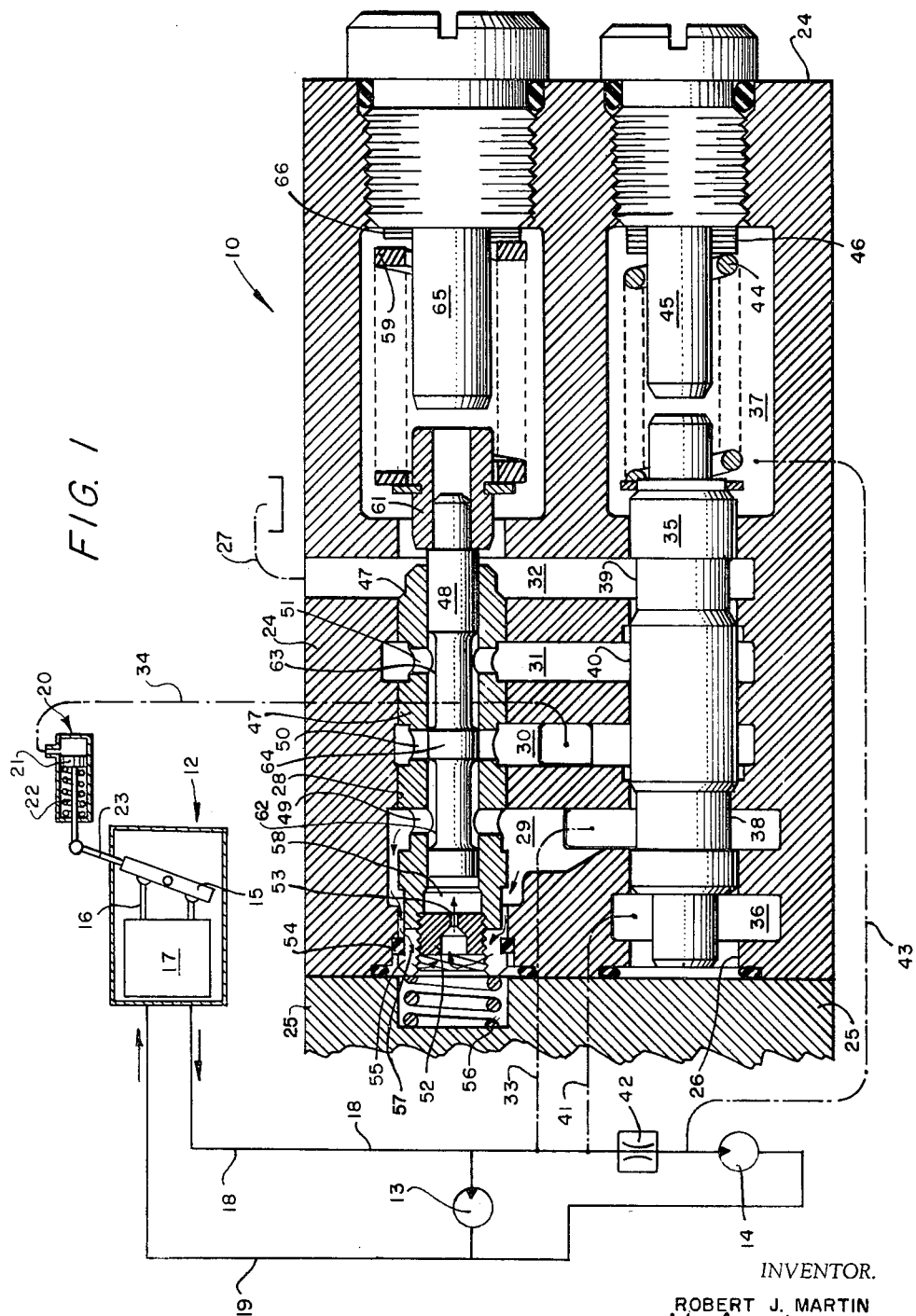
FIG. 1 is a sectional view of the flow and pressure compensating control valves neutrally positioned with the remainder of the hydraulic system symbolically illustrated.

Referring now to the drawings, and more specifically to FIG. 1, a pump compensating control generally identified by reference numeral 10, is shown in fluid communication with a pump 12 and a pluarlity of motors 13 and 14 all of which make up a hydraulic power system. The control 10 is actually an integral portion of the pump housing but for purposes of illustration it is separately shown in detailed section. Pump 12, symbolically illustrated, is a conventional axial piston positive displacement pump having a tiltable swash plate 15. Briefly mentioning its operation, the titlted swash plate 15 bears against a number of pistons 16 slidably mounted in a rotating cylinder block 17 causing the pistons 16 to reciprocate and discharge fluid through conduit 18. The angular position of the swash plate 15, which determines the rate of flow, is controlled by a single acting servo cylinder 20.

The servo piston 21 is connected by a mechanical linkage 23 to the swash plate 15 whereby spring 22 biases piston 21 into a position of maximum pump displacement. The biasing spring 22 could also be directly connected to the swash plate 15. The servo 20 is operatively connected to the compensating control 10 by line 34.

The compensating control 10 comprises a valve body 24 attached to the pump housing 25. Extending through the body 24 are two parallel spaced bores 26 and 28 connected by four longitudinally spaced separate passages 29 through 32. Passage 29 is in communication with the pump discharge flow through line 33. Passage 30 communicates with the pump servo cylinder 20 through line 34 while passage 32 is drained to atmosphere via line 27.

Positioned in bore 26 is a flow compensating valve spool 35 having two longitudinally spaced grooves 38 and 39 defining therebetween a center land 40. The opposite ends of the spool 35 extend into annular chambers 36 and 37 forming pilot cylinders for actuating the spool in opposite directions. Sensing line 41 connects chamber 36 with the pump discharge flow upstream of flow restrictor 42 while sensing line 43 connects chamber 37 with the downstream flow through restrictor 42. Compression spring 44 biases the spool 35 to the left against the pressure differential created in chambers 36 and 37. When the rate of flow to the motor 14 is correct, the pressure differential is precisely balanced by spring 44 with the spool 35 centered in the FIG. 1 position. If the rate of flow is excessive the pressure differential will overcome the spring 44, moving the spool 35 to the right. This movement will open passage 30 to the pump pressure in passage 29, causing fluid to flow from passage 30 to servo 20, thus reducing the pump displacement, until the spool 35 returns to its centered flow blocking position. If the flow to the motor 14 is deficient, the spring 44 overcomes the decreasing pressure differential and moves the spool to the left of its centered position. In this position passage 31 is opened to drain passage 32 as will be further described in conjunction with the operation of pressure compensating valve spool 48.

Positioned in bore 28 is a pressure compensating valve made up of a sleeve 47 and valve spool 48. The sleeve 47 has a plurality of lateral ports 49, 50 and 51 which communicate with previously mentioned passages 29, 30 and 31, respectively. Threadably mounted in the end of sleeve 47 is a plug 52 having an orifice 53 which restricts the flow rate into chamber 58. The left end of bore 28 is counter-bored to receive mounting ring 54 which in turn supports the flange 55 of sleeve 47. Spring 56 biases the sleeve 47 into fixed relation with ring 54. Extending longitudinally inward from the end of sleeve 47 is a diametrical slot 57 which provides a path for fluid flow from passage 29 to chamber 58, as indicated by the arrows in FIG. 1.

Spool 48 is formed with two longitudinally spaced grooves 62 and 63 separated by a land 64. The left end of spool 48 is subject to the pump discharge pressure in chamber 58 via the flow path just mentioned. When a specified pressure level is exceeded, spool 48 moves to the right of its FIG. 1 position, porting pressured fluid from passage 29 into passage 30 causing the servo 20 to decrease the pump displacement. If the pump discharge pressure is less than the specified pressure level, the spool land 64 moves to the left draining passage 30 into passage 31 to increase the pump displacement as will be further described in conjunction with the position of the flow compensating spool 35.

The pressure or flow compensating levels of spools 48 and 35 can be varied by adjusting the spring tension through the use of back-up washers 66 and 46.

The control 10 can be used in a system supplying one or more motors. FIG. 1 illustrates an application where one motor 14 is of the type requiring a precise volume of flow, such as a power steering unit and the other motor 13, such as an implement lift cylinder, does not require any special flow requirements.

OPERATION

Figure 4:
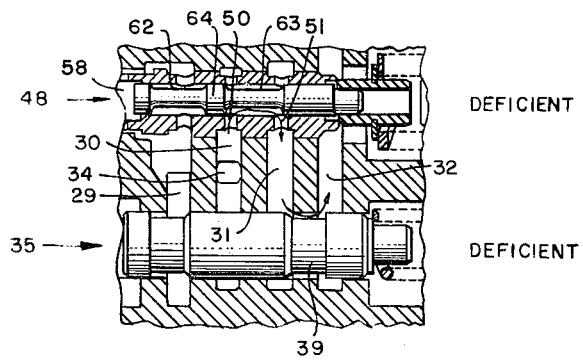
FIG. 4 is a view illustrating the flow compensating valve in a deficient flow position and the pressure compensating valve in a deficient pressure position.

Prior to starting the pump 12, both the flow compensating spool 35 and pressure compensating spool 48 will be spring-biased to the left, in their deficient flow and deficient pressure positions, as illustrated in FIG. 4. In this position the pump servo 20 is vented to atmosphere via line 34, passage 30, ports 50 and 51, passage 31, groove 39 and passage 32. With the servo 20 vented, spring 22 moves the swash plate 15 to the maximum displacement position, as illustrated in FIG. 1.

Since the pump 12 has a greater flow capacity output than both of the motors 13 and 14 combined can use, the pressure in discharge line 18 will immediately build up upon starting the pump to an excess level. Pressure compensating spool 48 will move to the right, compressing spring 59 from its FIG. 4 position to its FIG. 2 position, due to the excessive pressure experienced in chamber 58. This movement causes valve spool land 64 to cut-off the drain passage 31 and open the pressurized passage 29 to the pump servo 20, via line 34. The fluid from passage 29 will flow into servo 20, reducing the pump displacement until the pressure in chamber 58 returns to its compensating level.

When the pressure is precisely at the compensating level, 2500 p.s.i. for example, the spool 48 will center itself, with land 64 blocking flow through the port 50, as illustrated in FIG. 1.

Flow compensating spool 35 will move to the right when the flow rate through the restrictor 42 creates an adequate pressure differential between chambers 36 and 37 to overcome spring 44. When the flow rate becomes excessive, spool 35 moves to the right, to its FIG. 3 position, opening passage 29 to passage 30 so that fluid will flow to the servo 20 and reduce the pump displacement. As the ideal flow rate is approached, the spool 35 will move to the left, blocking flow from passage 29 to the servo 20.

Figure 2:
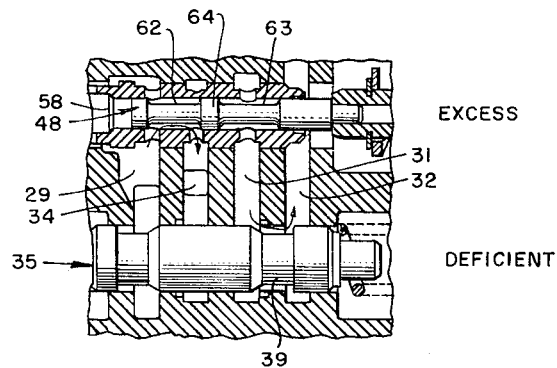
FIG. 2 is a view illustrating the flow compensating valve in a deficient flow position and the pressure compensating valve in an excess pressure position.

The pressure and flow compensating spools 48 and 35 are independent from each other, in that if either receives an excess indication, it will effect a reduction in pump displacement regardless of the position of the other spool. For example, if there was deficient flow going to motor 14 due to a heavy load and the pressure became excessive, spool 48 would in effect override spool 35 and reduce the pump displacement, as shown in FIG. 2.

Figure 3:
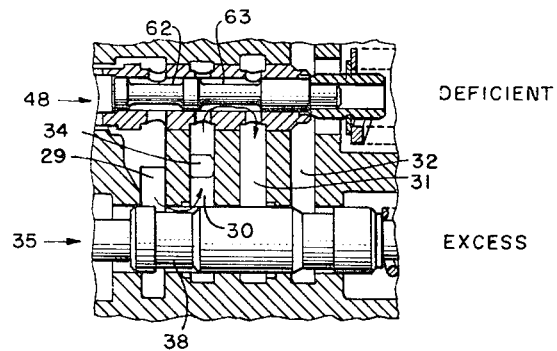
FIG. 3 is a view illustrating the flow compensating valve in an excess flow position and the pressure compensating valve in a deficient pressure position.

Another illustration of an override situation is shown in FIG. 3, wherein flow compensating spool 35 effects a reduction of pump displacement, while the spool 48 is indicating a deficient pressure. In this common situation, the spool 35 will maintain a constant preset flow rate to the motor while efficiently maintaining the pump output pressure at only the level required to operate the motor 14.

In another respect both of the spools are dependent upon each other, in that they must both be in the deficient positions (FIG. 4) before they can effect an increase in pump displacement. This is necessary since the fluid path to drain servo 20 must pass through both valve spool grooves 63 and 39.

Having described the invention with sufficient clarity to enable those familiar with the art to construct and use it.

I claim:

1. A pressure and flow compensating control system for a variable displacement axial piston pump with an outlet port having a tiltable swash plate actuated by a fluid operated servo means normally biased toward its maximum flow position, the system comprising:

first passage means communicating with the outlet port of the pump;

a flow restriction in said first passage means;

first pilot operated valve means communicating with the first passage means, responsive to a pair of opposing pilot cylinders one sensing the pressure upstream of the restriction and the other sensing the pressure downstream of the restriction;

second pilot operated valve means communicating with the first passage means responsive to a spring opposed pilot cylinder sensing the pressure in the first passage means;

second passage means separately communicating each of the valve means with the servo means;

third passage means communicating the second valve means to the first valve means;

fourth passage means communicating the first valve means to a low pressure reservoir;

the first valve means constructed in a manner to communicate the first passage means with the second passage means while blocking flow between the third and fourth passage means in a first operating position, communicate the third passage means with the fourth passage means while blocking flow between the first and second passage means in a second operating position, and a third operating position blocking all flow through the first valve means;

the second valve means constructed in a manner communicating the first passage means with the second passage means while blocking flow between the second and third passage means in a first operating position, communicates the second passage means with the third passage means while blocking flow between the first and second passage means in the second operating position, and blocking all flow through the second valve in a third operating position;

whereby the servo is actuated when either valve means moves to its first operating position regardless of the position of the other valve, and the servo is retracted only when both valve means are in their second operating position.

2. A pressure and flow compensating control system as set forth in claim 1 wherein:
the first valve means includes a valve spool, a first pilot cylinder sensing the pressure downstream of the restriction urging the spool into the second operating position, spring biasing means urging the spool in the same direction as the first pilot cylinder and a second pilot cylinder sensing the pressure upstream of the restriction urging the spool in the opposite direction, whereby said spool valve remains in the second operating position until the flow through said restriction approaches a preset rate, at which time pressure in the second pilot cylinder overcomes pressure in the first cylinder and the biasing means moving the spool to the third operating position and when the flow rate exceeds the preset rate, the increased pressures differential between the pilot cylinders moves the spool to its first operating position overriding the second valve means.

3. A pressure and flow compensating control system as set forth in claim 1, wherein:
said second valve means includes a valve spool, a pilot cylinder sensing the pressure in the first passage means urging said spool towards its first operating position, spring biasing means urging the spool in the opposite direction toward the second operating position whereby said valve spool remains in the second operating position until the operating pressure in the first passage means exceeds its preset level.

4. A pressure and flow compensating control system as set forth in claim 1, wherein:
the second valve means includes a valve spool, a pilot cylinder sensing the pressure in the first passage means upstream of the restriction urging said valve spool toward its first operating position, spring biasing means urging the spool in the opposite direction whereby the valve spool remains in the second operating position until the operating pressure in the first passage means approaches the preset level causing the spool to move to its third operating position and when the operating pressure exceeds the preset level the spool moves to the first operating position.

5. A pressure and flow compensating control system as set forth in claim 1, wherein:
the first passage means separately communicates with each of the first and second valve means, the servo means including a spring urging the swash plate toward its maximum flow position.

6. A pressure and flow compensating control system as set forth in claim 1, wherein:
the first valve means includes a valve spool, a first pilot cylinder sensing the pressure downstream of the restriction urging the spool into the second operating position, spring biasing means urging the spool in the same direction as the first pilot cylinder, a second pilot cylinder sensing the pressure upstream of the restriction urging the spool in the opposite direction, the second valve means including a second valve spool, a third pilot cylinder sensing the pressure in the first passage means urging the second valve spool toward its first operating position, spring biasing means oppositely urging the second spool toward its second operating position whereby the pump displacement is reduced when either of the valve spools are in their first operating position regardless of the position of the other, and the displacement is increased only when both valve spools are in their second operating position.

7. A pressure and flow compensating control system as set forth in claim 1 wherein:
the first valve means includes a valve spool having a center land which blocks flow between the third and fourth passage means in the first operating position, blocks flow between all of the passages in the third operating position and blocks flow between the first and second passage means in the second operating position.

8. A pressure and flow compensating control system as set forth in claim 1 wherein:
the second valve means includes a valve spool having a center land which blocks flow between the second and third passage means in the first operating position, blocks flow between all passage means in the third operating position, and blocks flow between the first and second passage means in the second operating position.

9. The combination of a variable displacement pump and a pressure and flow compensating control system comprising:
a fluid operated servo means for varying the output of said pump;
a first passage means communicating with the pump outlet port;
a flow restriction in the first passage means;
first pilot operated valve means communicating with the first passage means responsive to a pair of opposing pilot cylinders one sensing the pressure upstream of the restriction and the other sensing the pressure downstream of the restriction;
second pilot operated valve means communicating with the first passage means responsive to a spring opposed pilot cylinder sensing the pressure in the first passage means;
second passage means separately communicating each of the valve means with the servo means;
third passage means communicating the second valve means to the first valve means;
fourth passage means communicating the first valve means to a low pressure reservoir;
the first valve means constructed in a manner to communicate the first passage means with the second passage means while blocking flow between the third and fourth passage means in a first operating position, communicate the third passage means with the fourth passage means while blocking flow between the first and second passage means in a second operating position, and a third operating position blocking all flow through the first valve means;
the second valve means constructed in a manner communicating the first passage means with the second passage means while blocking flow between the second and third passage means in a first operating position, communicates the second passage means with the third passage means while blocking flow between the first and second passage means in the second operating position, and blocking all flow through the second valve in a third operating position;
whereby the servo is actuated when either valve means moves to its first operating position regardless of the position of the other valve, and the servo is retracted only when both valve means are in their second operating position.

10. A combination as set forth in claim 9, wherein:
the first valve means includes a valve spool, a first pilot cylinder sensing the pressure downstream of the restriction urging the spool into the second operating position, spring biasing means urging the spool in the same direction as the first pilot cylinder and a second pilot cylinder sensing the pressure upstream of the restriction urging the spool in the opposite direction, whereby said spool valve remains in the second operating position until the flow through said restriction approaches a preset rate, at which time pressure in the second pilot cylinder overcomes pressure in the first cylinder and the biasing means moves the spool to the third operating position and when the flow rate exceeds the preset rate, the increased pressure differential between the pilot cylinders moves the spool to its first operating position overriding the second valve means.

References Cited

UNITED STATES PATENTS

| | | | |
|---|---|---|---|
| 2,299,234 | 10/1942 | Snader et al. | 103—38 |
| 2,984,187 | 5/1961 | Prasse et al. | 103—162 |
| 3,179,060 | 4/1965 | Lehrer | 103—162 |
| 3,183,844 | 5/1965 | Pitt et al. | 103—162 |
| 3,444,689 | 5/1969 | Budzich | 103—38 |

HENRY F. RADUAZO, Primary Examiner

U.S. Cl. X.R.

417—300, 304